June 28, 1949.  J. C. KOHL ET AL  2,474,363
MOUNTING OF CELLULAR GLASS SLABS

Filed Nov. 19, 1943  5 Sheets-Sheet 1

Inventors
JOHN C. KOHL AND
JOHN A. DESMONE

By Olen E. Bee
Attorney

June 28, 1949. J. C. KOHL ET AL 2,474,363
MOUNTING OF CELLULAR GLASS SLABS
Filed Nov. 19, 1943 5 Sheets-Sheet 2
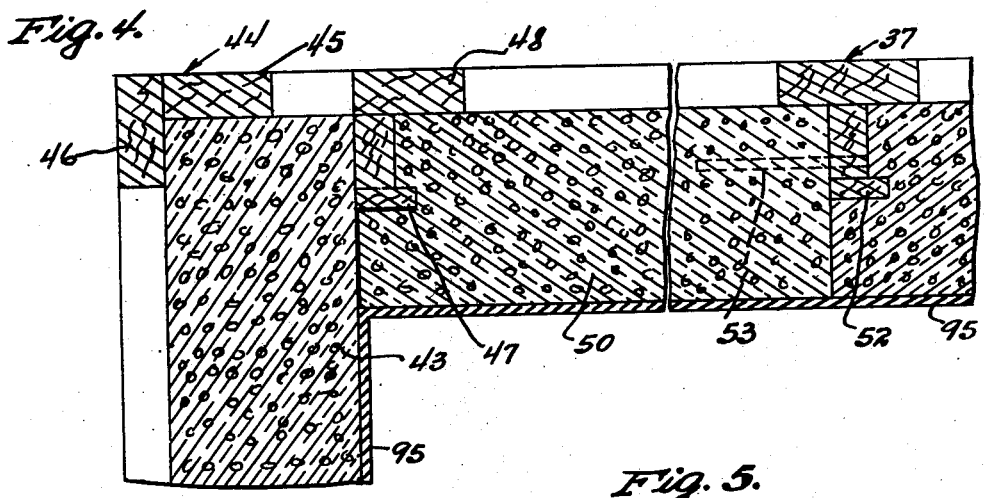
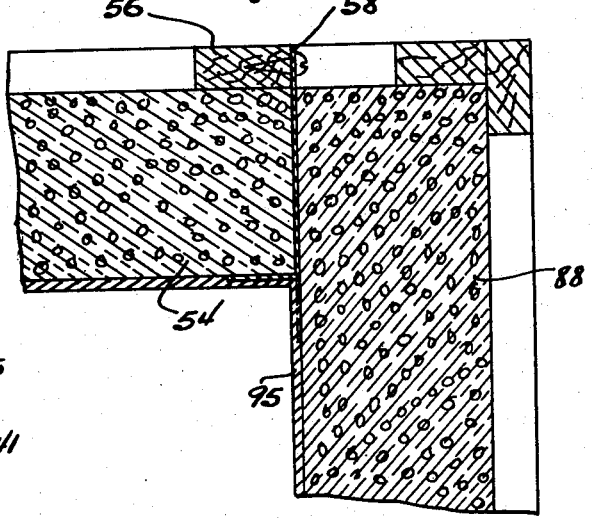
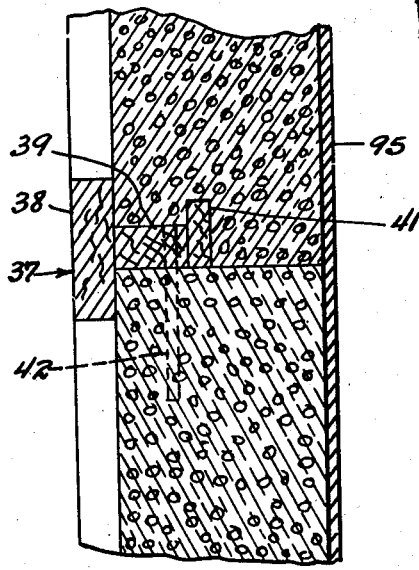
INVENTORS.
JOHN C. KOHL AND
JOHN A. DESMONE
BY
Olen E. Bee
ATTORNEY.

June 28, 1949.　　J. C. KOHL ET AL　　2,474,363
MOUNTING OF CELLULAR GLASS SLABS
Filed Nov. 19, 1943　　5 Sheets-Sheet 3
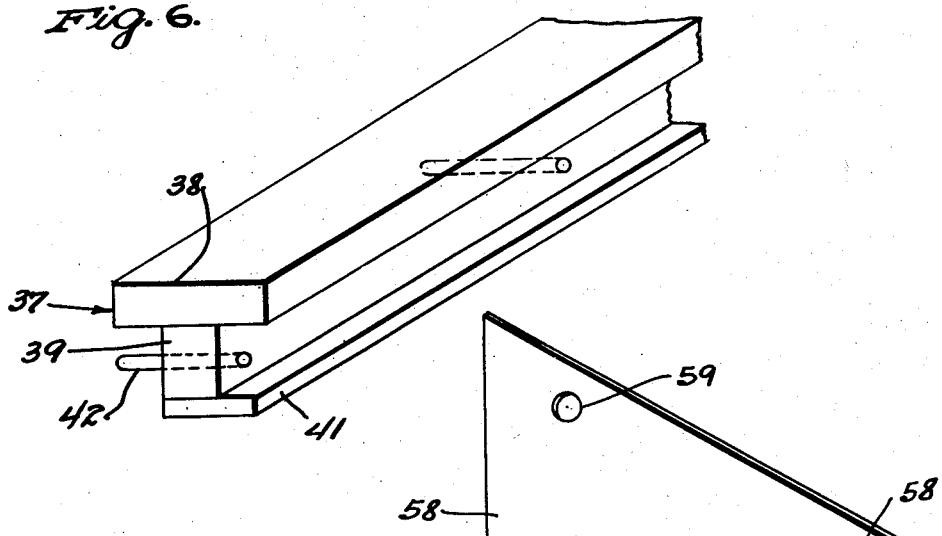
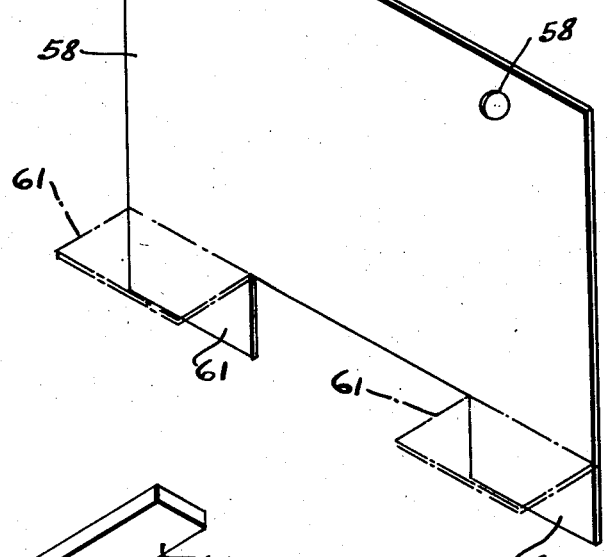
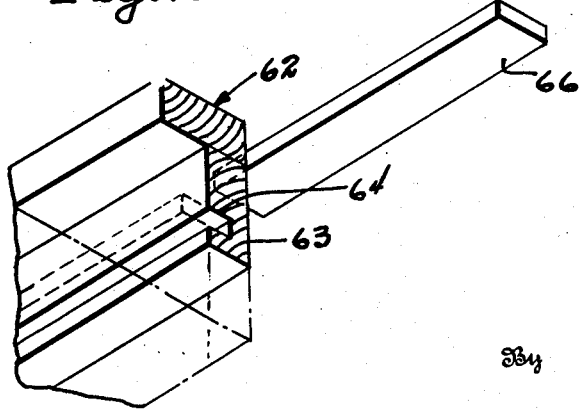
Inventors
JOHN C. KOHL AND
JOHN A. DESMONE
By Olen E. Bee
Attorney INVENTORS
JOHN C. KOHL AND
BY JOHN A. DESMONE
Olen E. Bee
ATTORNEY June 28, 1949.  J. C. KOHL ET AL  2,474,363
MOUNTING OF CELLULAR GLASS SLABS
Filed Nov. 19, 1943  5 Sheets-Sheet 5
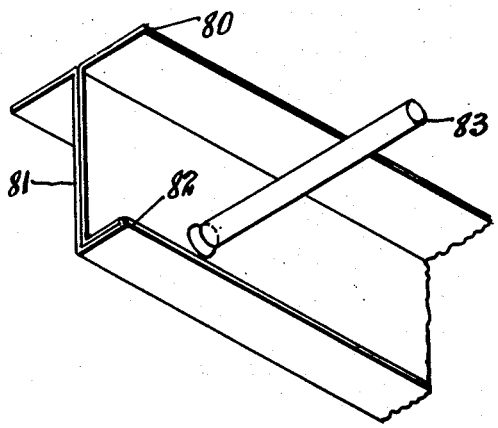
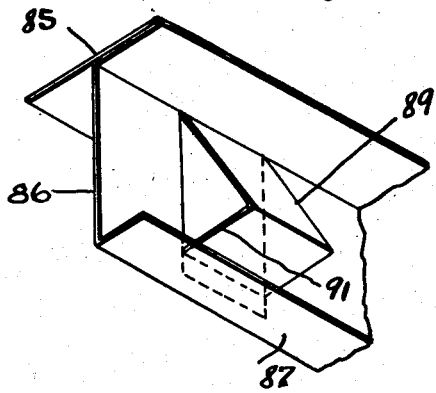
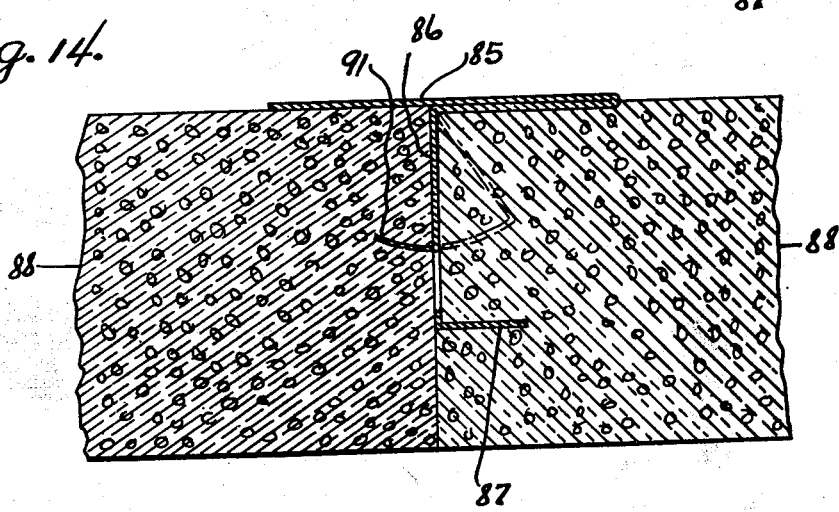
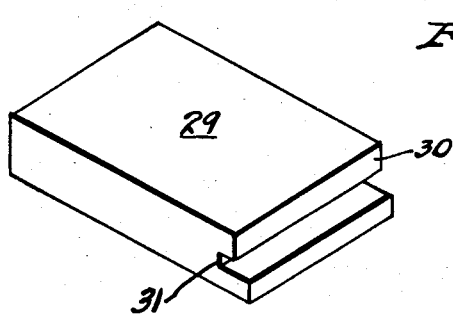
INVENTORS
JOHN C. KOHL and
BY JOHN A. DESMONE
Olen E. Bea
ATTORNEY.

Patented June 28, 1949

2,474,363

UNITED STATES PATENT OFFICE 2,474,363

MOUNTING OF CELLULAR GLASS SLABS

John C. Kohl, Pittsburgh, and John A. Desmone, Springdale, Pa., assignors to Pittsburgh Corning Corporation, a corporation of Pennsylvania Application November 19, 1943, Serial No. 510,934

2 Claims. (Cl. 72—19)

1

The present invention relates to the mounting of panels of building material in a wall and it has particular relation to the mounting of panels or slabs of so-called "Foamglas" to provide an insulative structure.

One object of the invention is to provide simple and convenient means for mechanically securing the panels or slabs to provide a continuous insulative wall.

A second object is to provide an insulative wall of a cellular glass in which the slabs or panels are positively mechanically secured to a framework without exposure of fastening elements upon the interior side.

A third object is to provide a structure of the foregoing type in which the assembly of the panels in the wall is effected with a minimum of effort.

These and other objects of the invention will be apparent from consideration of the following specification and the drawings upon which it is based.

Heretofore a highly durable and efficient insulating material has been prepared by heating a mixture of finely pulverized glass and a gas-producing agent, such as calcium carbonate or carbon black in pan-like molds of suitable dimensions in order to sinter the glass and to liberate the gases from the gassing agent to form bubbles in the coherent body, thus providing a highly cellulated slab of glass, which when suitably cooled and annealed possessed high insulative value against the transmission of heat. These foam-like bodies also possessed the high resistance to chemical agencies and permeation by moisture characteristic of glass.

Heretofore it has been customary to mount these panels to provide an insulative layer by cementing or bonding them to a continuous protective and supporting backing structure, such as a wall or the like. It has heretofore been difficult if not impossible merely mechanically to secure the panels or slabs in place in or upon a framework which did not provide a continuous backing to which they could be cemented.

The present invention contemplates the provision of a simple system for securing the panels as a continuous wall in a suitable framework. More specifically the invention contemplates securing the panels in place by means of mounting bars having appropriate flanges for engaging edge grooves of the individual panels or slabs one edge in such manner that each slab is individually supported without impressing strain upon contiguous units and further having piercing means

2 for engaging contiguous edges of the neighboring panels.

For a better understanding of the invention reference may now be had to the accompanying drawings in which like numerals refer to like parts throughout.

In the drawings Fig. 1 is a sectional view of a room or duct constructed in accordance with the provisions of the invention;

Figs. 2, 3, 4 and 5 are fragmentary sectional views illustrating upon a larger scale various details of the construction shown in Fig. 1;

Fig. 6 is an isometric view of one of the flange bars or rails employed to support the slabs or panels;

Fig. 7 is an isometric detail of a clip for securing the ungrooved edge of the final row of slabs or panels;

Figs. 10 and 11 are isometric views of details of the modifications shown in Figs. 8 and 9;

Figs. 12 and 13 are isometric views of modified forms of securing rails;

Fig. 14 is a sectional view of the form shown in Fig. 12; and

Fig. 15 is an isometric view of one of the cellular glass slabs.

Figure 1:
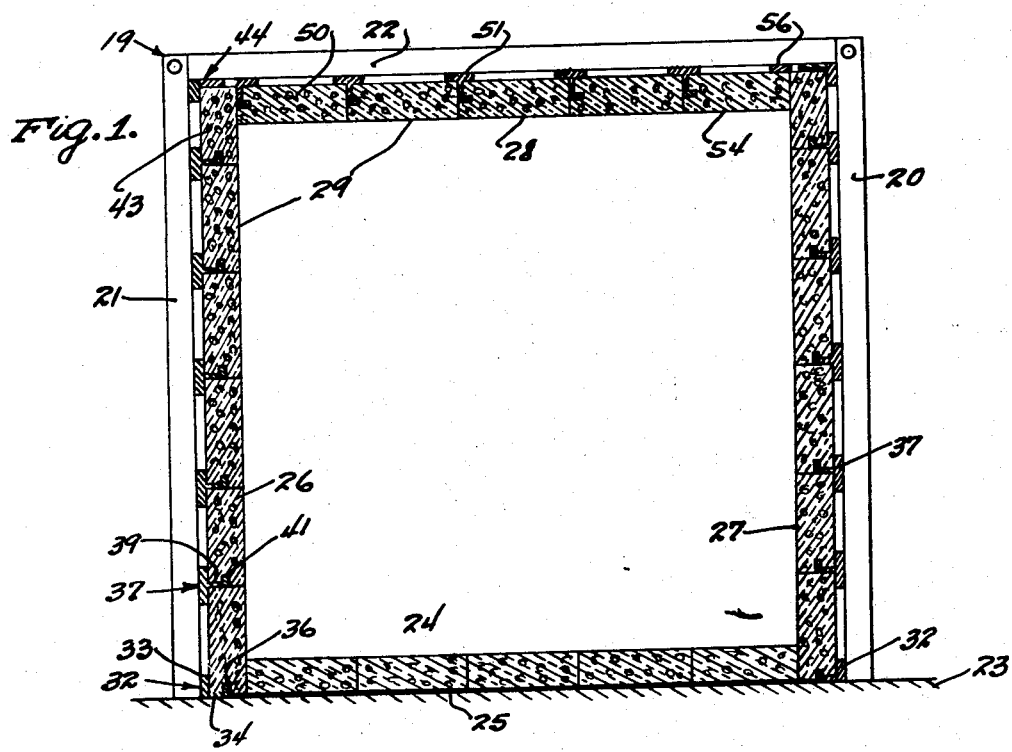

In the construction as shown in Fig. 1 a framework 19, such as a frame for an insulative duct, includes vertical members 20 and 21 secured together at their upper extremities by a transverse member 22 and resting at their lower extremities upon a suitable floor structure 23. The base of the duct or room is covered by means of simple ungrooved slabs 24 of "Foamglas" which may be of any convenient size and which are secured in place by mastic or asphalt. Also, similar material is employed to fill the joints between the units.

Figure 2:
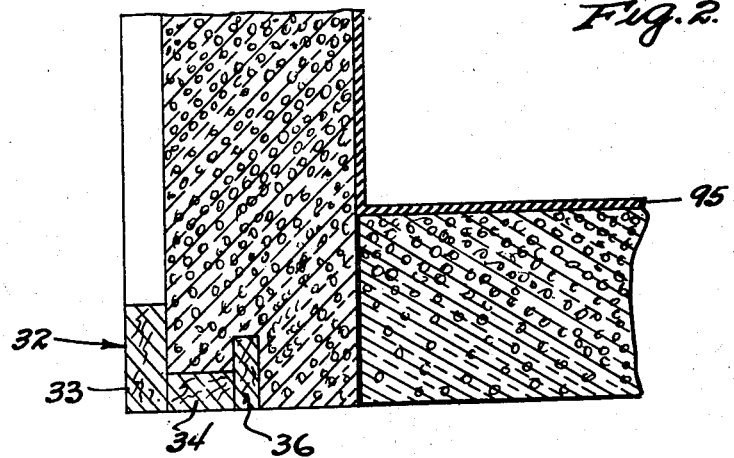

The walls and ceiling of the duct or room are indicated at 26, 27 and 28 respectively. Preferably these are formed of courses of blocks, slabs or panels 29, one of which blocks is shown in detail in Fig. 15. Each panel includes plane or ship lapped side edges and a plane or ship lapped upper edge, but the opposed lower edge is rabbeted as indicated at 30, and further is formed with a groove 31, extending below the bottom of the rabbeted portion and providing a tongue portion. The lower horizontal course of the panels or slabs, as shown in Fig. 2, is secured in place at its lower edge by means of angle-like bars 32 preferably of wood, having a vertical leg 33, which is nailed or otherwise secured to the vertical bars 20 and 21. The bar also includes a horizontal web or leg 34 having a flange 36 adapted to fit in the groove 31 of the lower block.

The subsequent blocks are secured and mounted upon spaced parallel bars 37, also of wood, shown in detail in Fig. 6 and approximately of T section including a transverse or cross portion 38 constituting a base nailed or otherwise secured to the members 20, 21 and 22 and a stem portion 39 having a flange 41 secured thereto and adapted to fit within the grooves 31 of the slabs resting thereupon so that the tongue portions of the blocks hook under the flanges. It will be noted that the backs of the webs are plane so that the edges of the blocks opposite the grooved edges will tilt downwardly within the space defined by the webs of the bars. The bars 32 and 37 may be formed of any convenient material, e. g., wood or metal, although, as above indicated, under present conditions wood is favored, because it is relatively non-strategic and it also possesses a high degree of insulation against the transmission of heat. The portion 39 of the bars 37 constituting the stem of the T are bored at appropriate intervals to receive short dowel-pins 42, which preferably fit slidably in the holes in such manner that the pins can readily be forced downwardly into the upper edges of the slabs or panels, thus preventing the latter edges from tilting inwardly. The edges of the cellular slabs are easily pierced by the pins without fracture, due to the cellularity of the glass.

The upper corners or edges of the uppermost slabs indicated at 43 are conveniently secured from tilting outwardly by means of angle members 44 including wooden bars 46 and 47 secured together in convenient manner, e. g., by nails and fitting over the corner of the slabs.

The ceiling structure best shown in Figs. 1 and 4 is composed of blocks identical with those of the sides and similarly secured in position. The first course or row of the ceiling slabs is secured at one edge, e: g., the left edge by means of an angle bar 48 identical with the angle bar 32 and having a flange 49 disposed in the grooves of the first course 50, of the blocks. The remainder of the courses are secured in place by means of bars 37 of the modified T section already described. The flanges 52 of these bars engage in one edge of each course of slabs and the opposite edges of the latter are secured by means of dowels 53 identical with the dowels 42.

It will be apparent that the slabs in the side walls can be easily secured in position merely by hooking the groove 31 over the appropriate flanges 36 or 41 and then tilting the upper edge of the blocks outwardly about the flanges as pivots until they engage the face portions 33 or 38 of the angle bars 32 or the T members 37. Of course the edge portions of the cellular slabs should be coated with asphalt or other plastic adhesive material and such material may also be run into the grooves between the slabs, thus providing a seal at the joints. Furthermore, the faces may be similarly coated if desired. When the slabs of a course are in position the dowel-pins 42 or 53 in next bar can be forced into the relatively frangible cellular material before the succeeding course is set up.

It will be apparent that special means must be provided for securing the last course 54 in the ceiling at the corner between it and the wall 27 where the edge of the ceiling abuts the face of the wall at its upper edge. Various constructions may be employed to effect this result. In Figs. 5 and 7 is disclosed a convenient embodiment means of accomplishing the function. As therein shown, a bar 56 is disposed contiguous to the edge of the last course 54 in the ceiling. Securing clips or plates 57 are mounted upon this bar by means of nails or screws 58 extending through openings 59. The plates are disposed between the edge of the ceiling and the face of the wall and at their lower extremities, the plates 57 are provided with lugs 61 which initially are in a common plane with the rest of the body 57. However, after the blocks of edge course 54 have been disposed in place these lugs are bent transversely as indicated in broken line in Fig. 7 in position to engage the lower faces of the blocks, thus securing the outermost edges thereof and providing a corner structure.

Figure 8:
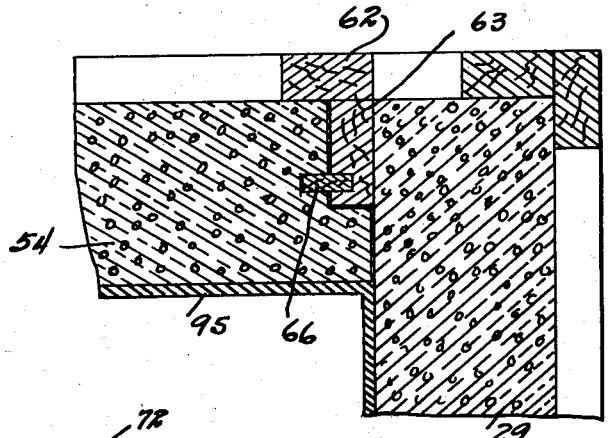
Figs. 8 and 9 are fragmentary sectional views of modifications of the construction for securing the ungrooved edges of the final course of slabs.

In the constructions shown in Figs. 8 and 10 the bars 62 corresponding to the bars 56 are provided with a downwardly-extending flange or element 63 disposed in a suitable rabbet in the edge of the blocks of the outermost course. This flange is grooved as indicated at 64 in Fig. 10 to receive splines 66, which are adapted to slide into the grooves after the blocks have been disposed in position. These splines are of sufficient width to project substantially beyond the grooves 64 into the mating grooves formed in the edges of the last course of blocks of the ceiling. In this construction the outer edges of the blocks in course 54 are simply lifted up into position and the splines 66 inserted in the grooves 64.

Figure 9:
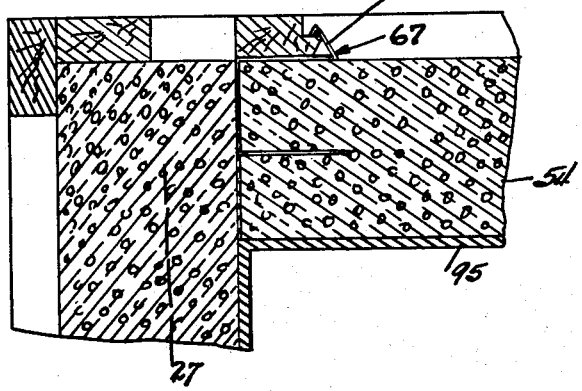
Figure 11:
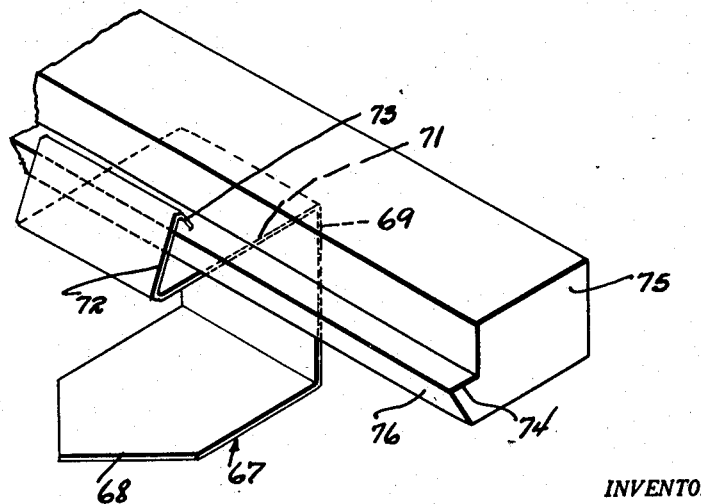

In the modification shown in Figs. 9 and 11 clip elements 67 are provided for securing course 54. These clip elements are approximately of U section and include a lower branch 68 which is adapted to be forced into the edge of the block or slab, an intermediate portion 69 extending upwardly over the edge of the slab to be supported and being connected to a second horizontal branch 71 extending over the upper face of the block. This latter branch 71 is also provided with an upwardly sloping flange 72 having a downwardly bent upper edge 73 adapted to hook over a shoulder 74 of a bar 76, corresponding to the bars 56 and 62. It is to be observed that the flange 73 of clip 67 and the edge 76 of the shoulder 74 are so sloped as to permit a sliding cam action when the outer edges of the blocks are swung upwardly into position. The spring action of the flange 72 then causes the edge 73 to snap into position to lock or latch the blocks of the course.

In Fig. 12 is shown a metal bar which may be employed in lieu of the bars 37. These bars are of modified T construction and may conveniently be formed by suitably folding and bending strips or sheets of metal. Each bar includes a cross or head portion 80 adapted to be secured to frame elements 20, 21 and 22 and a stem portion 81 with a transversely bent flange 82 that engages grooves in the blocks. The stem portion and the flange 82 may be formed simply by folding the intermediate portions of the strips of metal upon each other and then bending laterally the flange portions 82. The head portion 80 may be formed by bending outwardly an edge of each fold of the metal. Openings are formed in the stem portion 81 at intervals to receive dowel-pins 83 corresponding to the pins 42 and 53 already described.

In the construction shown in Figs. 13 and 14 strips or ribbons of sheet metal are employed to provide metallic bars as substitutes for the bars 37 and dowel-pins already described for supporting the edges of the panels. In the construction shown in Fig. 12, portion 85 of the metal strip corresponding in width to the head portion of the modified T is folded downwardly. A stem portion 86 is then bent along a line approximately median of the width of the portion 85. The lower edge of this stem portion is laterally bent to provide a flange 87 for engaging the edge grooves of cellular glass, blocks or slabs. Lugs or tabs 89, secured at their upper end, are punched out at intervals along the stem or web portion 86 as best shown in Fig. 13. The lower extremities of these lugs or tabs are also bent approximately arcuately inward to provide tongue portions 91 that can be forced inwardly into the edges of the blocks as indicated in Fig. 14.

The procedure involved in the assembly of the construction of course involves first the erection of the supporting framework including vertical members 20 and 21 and the transverse members 22. The bars 32, 37 and 44 can then be secured in place. The slabs are set by hooking the grooves in the edges of flanges 36, 41, 47 or 52, according to the position of the block. The block is then swung into position about the flange. A course is thus built up. If a course has been preceded by other courses the dowels 42 or portions 91 are forced into the plain edge of the preceding course before the foregoing setting operation. The side walls 26 and 27 are first assembled and then the ceiling 28 is erected between the side walls. Finally the floor 24 is laid and the joints of the structure are suitably filled with mastic or other sealer. The faces of the slabs are covered by means of a protective layer of mastic indicated at 95.

The forms of the invention herein shown and described are to be considered merely as representative. It will be apparent to those skilled in the art that numerous modifications may be made therein without departure from the spirit of the invention or the scope of the appended claims.

What we claim is:

1. A heat insulative wall comprising a pair of spaced parallel supporting bars, the bars each having an outwardly projecting web and a flange on the web of one bar, said flange extending toward the second bar, the side of the web of the second bar facing the first mentioned bar being essentially smooth and further having pin receiving openings formed therein, a course of cellulated glass slabs supported by the bars, said slabs at one edge having tongue portions hooked under said flange to prevent outward displacement of the slabs, the edges of the slabs opposite said tongues being adapted to tilt back within space between the bars in proximity to the web of the second bar and pin means in the openings in the web of the latter bar projecting into the edges of the blocks to hold the latter edges in place.

2. A heat insulative wall comprising a pair of spaced parallel supporting bars, the bars each having an outwardly projecting web, a flange on the web of one bar extending toward the second bar, the web of the second bar on the side facing said flange being smooth and further having openings formed therein, a course of cellulated glass slabs supported by the bars, said slabs being grooved upon one edge, to provide tongues, the tongues being hooked under said flange to secure the corresponding edges of the slabs in place, the opposite edges of the slabs being smooth and being adapted to tilt down into the space between the webs of the bars in contiguity to the web of the second bar and anchoring devices constituting piercing means disposed in the openings of said second bar and projecting into the corresponding edges of the slabs to hold the blocks from tilting outwardly from the space.

JOHN C. KOHL.
JOHN A. DESMONE.

REFERENCES CITED

The following references are of record in the file of this patent:

UNITED STATES PATENTS

| Number | Name | Date |
|---|---|---|
| 468,132 | Dieterich | Feb. 2, 1892 |
| 1,974,819 | Koerner | Sept. 25, 1934 |
| 1,976,577 | Piazza | Oct. 9, 1934 |
| 1,984,028 | Macleod | Dec. 11, 1934 |
| 1,989,289 | Piazza | Jan. 29, 1935 |
| 2,154,520 | Mackin | Apr. 18, 1939 |
| 2,162,303 | Greulich | June 13, 1939 |
| 2,201,778 | Kump | May 21, 1940 |
| 2,258,573 | Leary | Oct. 7, 1941 |
| 2,301,062 | Long | Nov. 3, 1942 |

OTHER REFERENCES

Foamglas (publication by Pittsburgh Corning Corporation, Pitts., Pa.), published May, 1942, 72-Glass Block Digest.